Nov. 9, 1954

E. A. STALKER 2,693,677

ROTARY TURBINE-TYPE HYDROKINETIC TORQUE
CONVERTER WITH ADJUSTABLE BLADES

Filed Nov. 7, 1949

INVENTOR.
Edward A. Stalker

Nov. 9, 1954 — E. A. STALKER — 2,693,677
ROTARY TURBINE-TYPE HYDROKINETIC TORQUE CONVERTER WITH ADJUSTABLE BLADES
Filed Nov. 7, 1949 — 3 Sheets-Sheet 2

INVENTOR.
Edward A. Stalker

Nov. 9, 1954     E. A. STALKER     2,693,677
ROTARY TURBINE-TYPE HYDROKINETIC TORQUE
CONVERTER WITH ADJUSTABLE BLADES
Filed Nov. 7, 1949     3 Sheets-Sheet 3

INVENTOR.
Edward A. Stalker

United States Patent Office 2,693,677
Patented Nov. 9, 1954

2,693,677

ROTARY TURBINE-TYPE HYDROKINETIC TORQUE CONVERTER WITH ADJUSTABLE BLADES

Edward A. Stalker, Bay City, Mich.

Application November 7, 1949, Serial No. 125,858

13 Claims. (Cl. 60—54)

My invention relates to power transmissions of the type including a hydrokinetic torque converter and particularly to means of controlling the fluid flow directions relative to the blading.

An object of this invention is to provide a novel means of controlling the relation between the fluid flow and the wheels of hydrokinetic transmissions.

Another object is to provide automatic means of controlling the direction of the fluid flow relative to the blades of a torque converter.

Other objects will appear from the description, drawings and claims.

The above objects are accomplished by the means illustrated in the accompanying drawings in which—

In hydrokinetic torque converters, it is difficult to achieve high efficiency over a wide range of ratio of driven shaft speed to driving shaft speed because of the variation in the direction of the flow relative to the blades of the wheels or rotors of the converter.

In this invention novel means are employed to keep the flow approaching the blades at a proper angle. One of these means is to adjust the value of the fluid velocity in the vicinity of the blades.

Figure 1:
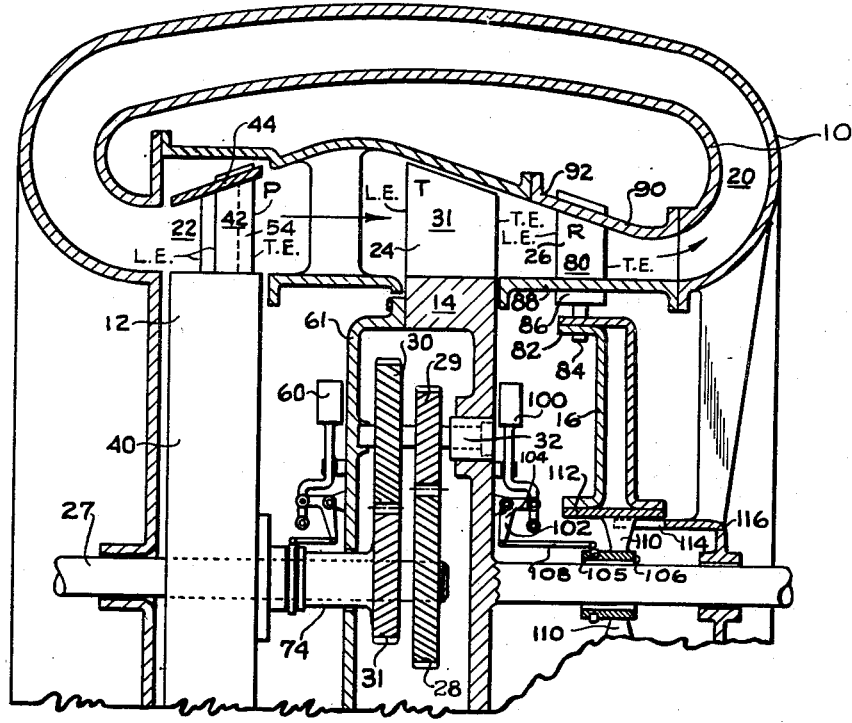
Fig. 1 is a fragmentary axial section through a transmission according to this invention.

In Fig. 1 the torque converter housing is 10, the pump wheel is 12 (or P), the turbine wheel is 14 (or T) and the reaction member is 16 (or R).

The housing defines the annular passage 20 which forms a closed circuit with the passages 22, 24, and 26 through the respective wheels.

The pump wheel induces the flow through the circuit when it is rotated by power input shaft 27 turning gears 28—31, the latter being the pump gear fixed to the pump wheel and rotatable on shaft 27. The shaft 32 is rotatably borne on the turbine wheel.

The gear arrangement provides for a high rotative speed of the pump wheel when the turbine wheel is stationary, that is stalled. At nearly equal speeds of the turbine wheel and pump wheel the latter approaches the rate of rotation of the input shaft 27.

The turbine wheel experiences a torque from the flow acting on its blades 31 to turn the driven shaft 34.

The reaction member realigns the flow from the turbine to give it the proper spin with respect to the pump wheel inlet.

Figure 4:
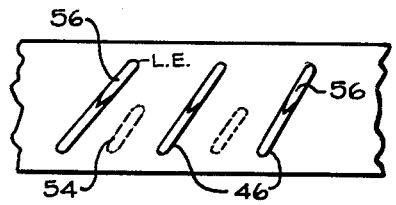
Fig. 4 is a fragmentary radial view of the shroud of the pump wheel.

The pump wheel is comprised of the hub 40, the blade assembly 42 and the conical shroud 44. The blades are substantially straight chordwise and at their tip ends they project through slots 46 in the shroud (see Fig. 4).

Figure 2:
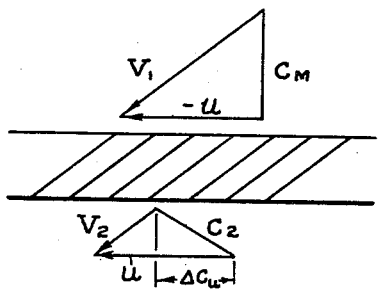
Fig. 2 is a fragmentary development of the blading of a pump wheel showing the associated flow vectors.

Fig. 2 shows a fragmentary development of a pump wheel blading of the type employed in the converter, with the flow vectors at entrance and exit. The absolute inlet vector is $C_m$, the peripheral vector is $-u$ and the relative inlet vector is $V_1$. At exit the relative vector is $V_2$ and the absolute velocity is $C_2$. The spin added to the fluid is $\Delta C_u$ since the fluid was originally moving in the direction $C_m$. There is also pressure rise in the rotor because of the radially expanding passages 48 between blades. Thus even though the blades are straight and the rotor flow is parallel to the blades, the rotor provides pumping action.

Figure 3:
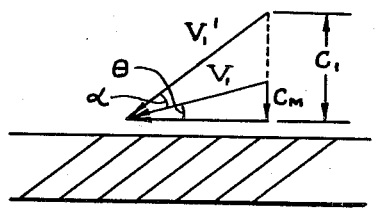
Fig. 3 is the blading of Fig. 2 with different flow vectors.

Fig. 3 shows a fragmentary development of the same blading as Fig. 2 for a much smaller axial velocity $C_m$. In this case it will be observed that the relative flow vector $V_1$ makes a much flatter angle $\theta$ with the plane of rotation.

The vectors for Fig. 2 may be considered to correspond to the condition of turbine wheel stalled since then there would be a high axial velocity. Fig. 3 would correspond to a high turbine speed since then the axial velocity is low.

In Fig. 3 the angle of attack $\alpha$ of the blade is so large that the flow will be shocked into entering the wheel and the efficiency will be low. The pump wheel of this invention as shown in Figs. 1 and 4–6 discloses a novel means of avoiding this shock loss.

The blades of the pump wheel are in a tapered passage whose inlet area is smaller than the area at the blade trailing edges. Thus the axial flow velocity is higher at the inlet than at points further downstream. Hence if the blades are displaced upstream they are subjected to a higher fluid velocity. Thus in Fig. 3 the axial velocity $C_m$ would be increased to $C_1$ and the inlet vector $V_1'$ would become parallel to the blade chord, which is the most efficient position for the vector.

Figure 5:
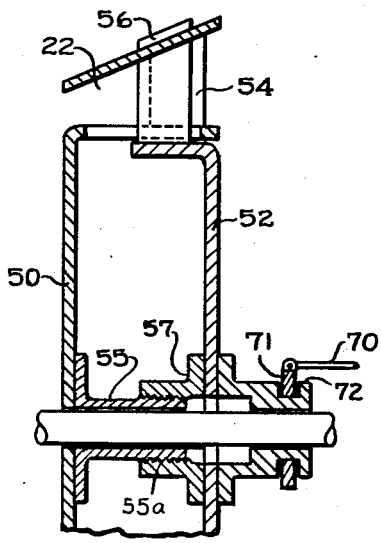
Fig. 5 is a fragmentary axial section of the pump wheel of Fig. 1.

The pump wheel as shown in Figs. 1 and 4–6 has telescopic hub sections 50 and 52 (see Fig. 5). One group of blades 54 is fixed on the front hub section 50, and the other group of blades 56 is fixed on the rear or inner hub section 52 and the rear section blades are alternated peripherally with the front section blades.

Figure 6:
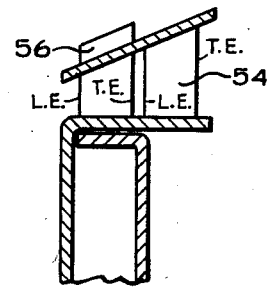
Fig. 6 shows a fragment of the pump wheel of Fig. 5 with some of the blading moved to the forward position.

If the inner hub section is displaced forward the blades 56 are displaced forward where the radial depth of the annular passage 22 at the leading edges of blades 56 is about half of the depth at the leading edge L. E. of blades 54—as shown in Fig. 6. Thus the fluid axial velocity at the leading edges of the blades when in the forward position is about twice the velocity at the leading edges of the blades when in the rear position. Since the magnitude of the peripheral component of velocity remains constant and the axial velocity is about doubled, for instance, the angle of approach of the fluid to the blades is substantially altered. Consequently the angle of approach of the flow to the blades is changed to a desired value.

It is also to be noted that the flow of fluid in the conduit means proceeds relative to the blades across their trailing edges T. E.

The slots 46 in the conical surface converge somewhat forwardly to accommodate the sections of the blades which are closer together at smaller radii.

When the section 52 is pushed forward it also rotates to accommodate for the pitch setting of the blades. For this purpose the hub elements 55 and 57 have external multiple and internal threads respectively of the same pitch as the blades. A small clearance between the blades and the sides of the slots 46 is provided to accommodate a small secondary angular movement of the blades.

Figure 5A:
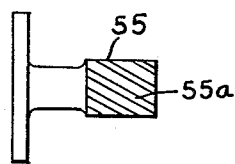
Fig. 5a is a side view of the multiple splined or threaded part 55 for shifting the blades axially.

The splines or threads 55a (Figs. 5 and 5a) on the element 55 and in the element 57 are of the proper pitch to move the blades peripherally the proper amount for the axial movement thereof. Usually the peripheral displacement will be only a small number of degrees.

When the turbine wheel is stalled the movable pump blades should be in the rear position (Fig. 5) and when the turbine wheel is turning at maximum speed the blades should be in the forward position (Fig. 6). This action may be accomplished automatically in response to one of the power factors of the turbine wheel. The power of the turbine wheel is equal to the product of the two power factors, angular velocity and torque.

Figure 7:
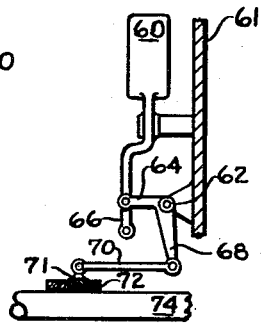
Fig. 7 is an enlarged fragmentary view of the mechanism for controlling the blade displacements according to centrifugal force.
Figure 8:
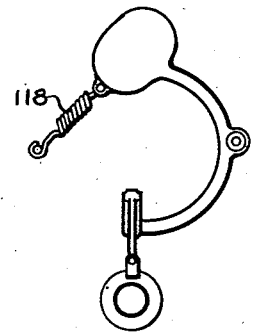
Fig. 8 is a front axial view of the mechanism of Fig. 7.

In Figs. 1, 7 and 8 a fly weight 60 is shown pivotally supported on hub member 61 of the turbine wheel. As the wheel rotates the weight moves radially outward due to centrifugal force. The centrifugal movement causes the pump blades 56 to be displaced forward by the mechanism operably connecting the weight to the pump wheel hub section 52.

The turbine wheel hub member 61 pivotally supports the bell crank 62 whose short arm 64 is linked by link 66 to the weight and whose long arm 68 is linked by link 70 to the sliding ring 71 in the groove 72 on hub element 57 which is fixed to the pump wheel hub section 52.

Figure 9:
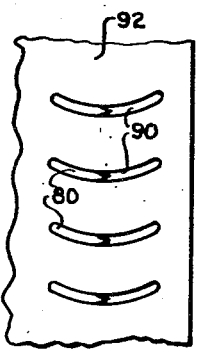
Fig. 9 is a fragmentary radial view of the case about the tips of the blades of the reaction member.

As shown particularly in Figs. 1 and 9 the reaction member 16 has axially displaceable blades 80. These are pivotally supported in the hub 82 on the stub shafts 84. The blades project through slots 86 in the inner shroud 88 and slots 90 in the outer shroud 92.

The blades preferably have substantially circular arc cross sections and the slots conform to the blade sections so that they may be slid axially and turned about stub shafts 84. Thus the blades as they move axially change their pitch and also move to a portion of passage 26 having different radial depth. The change in depth changes the axial velocity of the flow and varies the angle of attack of the blades. The rotation of the blades also changes their angle of attack. Either means might be used independently of the other. If the blades were not to be rotated the blades and the slots 86 and 90 could be straight rather than curved. If the blades are to be rotated without a change in passage depth, the shrouds 88 and 92 can be made parallel.

When the turbine wheel is stalled the reaction member blades are to be forward. For high speed they will be displaced rearward. As for the pump this can be made to depend on a power factor of the turbine.

A fly weight 100 similar to 60 is pivoted on the rear face of the turbine wheel and actuates a bell crank 102 whose arm 104 is linked to the sliding ring 105 on hub 106 by link 108. As the speed of the turbine increases the weight flies outward and displaces the hub 106 and blades 80 rearward. The brackets 110 fixed to 112 slide in a suitable slot 114 in the case member 116.

The fly weights are returned radially inward by the springs 118 each connected at one end to the weight and at the other to the turbine wheel.

Thus as shown in Fig. 1 both the pump wheel and the reaction member can be controlled by the turbine wheel, as a function of its rate of rotation.

Since the blades of the pump wheel are subjected to centrifugal stresses it is desirable to have them fixed to their hub. Then it is desirable to change the angle of attack by displacing the blades forward.

The reaction member does not rotate so its blades are not highly stressed. It is therefore practical to have the blades pivoted to their hub.

Figures 10, 11:
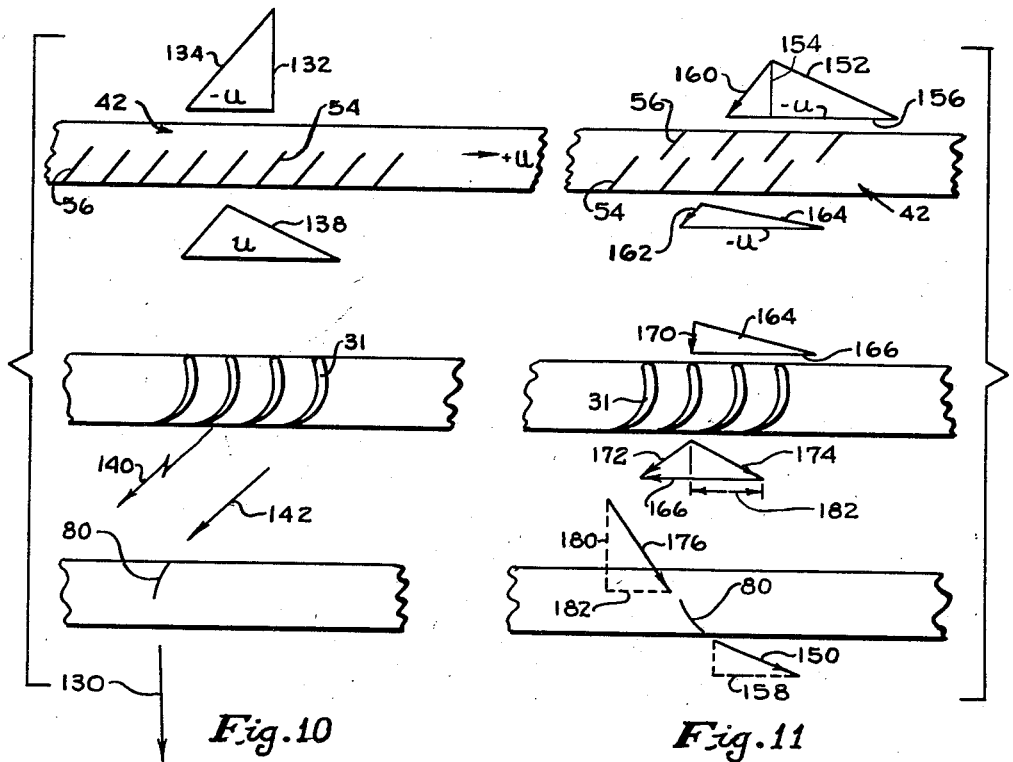
Fig. 10 is a fragmentary development of the blading of the pump and turbine wheels and of the reaction member or wheel with additional space between bladings for displaying the flow vectors.
Fig. 11 is the same blading as shown in Fig. 10 but with different flow vectors.

Figs. 10 and 11 show fragmentary development of the blading of the wheels and reaction member, the former figure being for the condition of turbine wheel stalled, the latter for the turbine wheel at high speed. The rows of blading are spaced apart to provide space for the vector diagrams.

Referring to Fig. 10 the fluid leaves the reaction member blades 80 in an axial direction as indicated by vector 130. When the flow is returned to the pump inlet by the annular duct 20 the axial vector has been decreased in magnitude due to the expansion in the annular duct and the axial flow vector becomes 132. Then the relative or approach vector is 134. The peripheral speed of the pump blade is $u$ and the relative peripheral flow vector is $-u$.

The flow is discharged from the pump wheel with the absolute vector 138. This is also the approach vector to the turbine blades since they are not rotating. The flow leaves the turbine as shown by vector 140. Its magnitude is larger than 138 because of the converging passages of the turbine.

The reaction member blades are forward so the vector 142 of the flow is shorter than 140 and also flatter since it is only the axial component which is influenced by the converging passages of the member. The blades 80 receive the flow without shock.

In Fig. 11 the turbine wheel is turning at a peripheral speed approaching the speed of the pump blades.

The reaction blades have been displaced backward and turned. They direct the flow with the vector 150. The flow is led from the member to the pump inlet and is given by vector 152. Now the pump blades 56 are forward and the axial velocity is increased by the narrow radial depth of the pump wheel passage. The flow however has a very low axial velocity because the turbine wheel turns along with the pump wheel and reduces the flow velocity. The axial velocity at inlet is indicated by 154. The peripheral component 156 is about the same as the peripheral component 158 of the vector 150.

When combined with the peripheral vector $-u$ the vector relative to the blades is 160 and is substantially parallel to the blades as desired.

The flow at leaving the pump has the relative vector 162 and the absolute vector 164.

At entrance to the turbine blading the vector 164 is combined with the relative peripheral vector 166 which is less than $u$ giving the entrance vector 170. This vector is enlarged at leaving to vector 172 giving an absolute leaving vector 174.

Since the axial flow in the reaction member will be accelerated by the converging passage of the member, the vector 174 will become 176. This vector has also been rotated due to the elongation of the axial component while the peripheral remains the same. The new axial component is 180. The peripheral component is 182. The blades 80 in their rearward position are in the proper position to receive the flow without shock and to direct the flow properly to enter the pump wheel inlet without shock.

Figure 13:
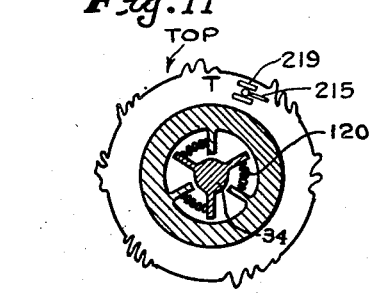
Fig. 13 is a fragmentary transverse section of the turbine wheel hub to display the elastic connection between the turbine shaft and the wheel hub.
Figure 12:
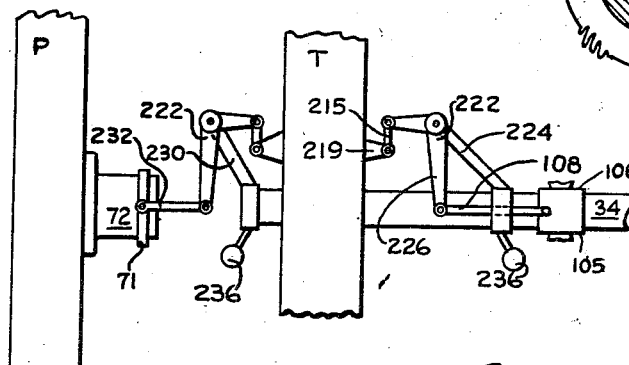
Fig. 12 is a fragmentary top view of an alternate mechanism for controlling the displacement of the blades, namely according to the torque applied to the turbine wheel.

In a variation of the invention shown in Figs. 12 and 13, the change in the position of the blades is made to depend on the other power factor, namely the torque developed on the turbine wheel. For this purpose the turbine wheel is elastically mounted on its shaft, and the rotational displacement relative to its shaft is used to govern the displacement of the pump and reaction member blades.

The springs 120 provide for displacement of the turbine wheel relative to the turbine shaft 34. A link 215 is universally connected at its opposite ends to arm 217 of bell crank 222 and to bracket 219 fixed on the turbine. As the wheel is displaced by the fluid applied torque, it rotates the bell crank 222 carried on the arm 224 fixed to the turbine shaft. The longer arm 226 of the bell crank is linked to the sliding ring 105 on the reaction member hub 106. A similar mechanism relates the displacement of the turbine to the pump wheel blades.

The bracket 230 fixed to turbine shaft 34 supports the bell crank 222 on the forward side of the turbine wheel. This crank is connected by link 232 to the sliding ring 71. The cranks are counter-balanced by the weights 236.

When the turbine shaft 34 is held and a high torque is applied to the turbine wheel it moves relative to the shaft and turns bell crank 222. The movement of the crank displaces the blades toward the turbine. That is the pump blades move backward to the deepest portion of the flow passage and the blades of the reaction member move to the deepest portion of its flow passage. When the torque decreases the blades are moved in the opposite manner.

I use the terms reaction member or reaction wheel interchangeably to denote a bladed structure for turning the flow. This structure may be stationary or rotatable.

While I have illustrated specific forms of the invention, it is to be understood that variations may be made therein and that I intend to claim my invention broadly as indicated by the appended claims.

I claim:

1. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump wheel for rotation about an axis and for adjustable displacement along said axis, means to rotate said pump wheel to induce a flow of fluid through said turbine to apply the properties of torque and rate of rotation thereto, means mounting said turbine wheel for rotation about an axis, said pump wheel having a plurality of radially extensive blades, said conduit having variable radial depth along the axial length of said blades, and means operably connecting said pump wheel to said turbine wheel to displace said pump wheel axially relative to said turbine wheel as a function of a said property of said turbine wheel.

2. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump and turbine wheels for rotation about an axis, means to rotate said pump wheel to induce a flow of fluid through said turbine wheel to apply the properties of torque and rate of rotation thereto, means mounting said reaction wheel for adjustable axial displacement, said reaction wheel having a plurality of radially extensive blades, said conduit having variable radial depth along the axial length of said blades, and means operably connecting said reaction wheel to said turbine wheel to displace said reaction wheel axially as a function of a said property of said turbine wheel.

3. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump wheel for rotation about an axis and for adjustable displacement along said axis, means to rotate said pump wheel to induce a flow of fluid through said turbine to apply a torque thereto, means mounting said turbine wheel for rotation about an axis, said pump wheel having a plurality of radially extensive blades, said conduit having variable radial depth along the axial length of said blades, and means operably connecting said pump wheel to said turbine wheel to displace said pump wheel axially relative to said turbine wheel as a function of the rate of rotation of said turbine wheel.

4. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump and turbine wheels for rotation about an axis, means to rotate said pump wheel to induce a flow of fluid through said turbine wheel to apply a torque thereto, means mounting said reaction wheel for adjustable axial displacement, said reaction wheel having a plurality of blades whose trailing edges extend radially transverse to said flow of fluid, said conduit means having variable radial depth along the axial length thereof, said conduit means being designed for axial movement of said blades of said reaction wheel to localities of said conduit means of substantially different radial depths, and means operably connecting said reaction wheel to said turbine wheel to displace said reaction wheel axially to said localities of said conduit means of substantially different radial depths as a function of the rate of rotation of said turbine wheel.

5. In combination in a fluid transmission, a pump wheel, a turbine wheel and a reaction wheel arranged in succession in the order stated, conduit means cooperating with said wheels to define a closed fluid circuit for the circulation of fluid through said wheels in succession, means mounting said pump wheel for rotation about an axis and for adjustable displacement along said axis, means mounting said reaction wheel for axial adjustment, means to rotate said pump wheel to discharge fluid into said turbine to apply the properties of torque and rate of rotation thereto, means mounting said turbine wheel for rotation about an axis, and means operably connecting said turbine wheel to said pump wheel and said reaction wheel to displace said pump and reaction wheels axially relative to said turbine wheel as a function of a said property of said turbine wheel.

6. In combination in a hydrokinetic transmission, a conduit means having cross sections of different depths axially therealong for the flow of fluid therethrough, a pump wheel and a turbine wheel arranged in said conduit means for the flow of fluid through each under the action of said pump wheel, means mounting each said wheel for rotation at different speeds about an axis, each said wheel having blades operable in said conduit means, each said blade having spaced leading and trailing edges for a free flow of said fluid thereacross, and means to displace one of said wheels axially relative to the other to cross sections of said conduit means of substantially different radial depths as a function of the rate of rotation of said other wheel.

7. In combination in a hydrokinetic machine adapted for the interchange of energy with a fluid, a conduit means having cross sections of different radial depths axially therealong for the flow of fluid therethrough, a rotatable pump wheel and a second wheel arranged in said conduit means to define therewith a fluid circuit for the circulation of fluid therethrough to apply a fluid torque to said second wheel by the rotary action of said pump wheel, each said wheel having blades operable in said conduit means, each said blade having chordwise spaced leading and trailing edges for a free flow of said fluid thereacross, and means to displace one of said wheels axially relative to the other of said wheels to said cross sections of said conduit means of said different radial depths.

8. In combination in a hydrokinetic transmission, a pump wheel, a turbine wheel, and a reaction wheel, means mounting said pump and turbine wheels for rotation each about an axis, said wheels defining a circuit for the flow of fluid therethrough in succession, a said wheel comprising a hub, a conical case encircling said hub and spaced radially therefrom to define a fluid flow passage, said case having a plurality of peripherally spaced slots therein, said slots being axially extensive, a plurality of blades mounted on said hub and each extending radially through a said slot, means mounting said blades for axial displacement relative to said case to vary the radial depth of said passage at said blades between said hub and said case, and means operably connected to said turbine wheel to displace said blades relative to said case as a function of the rate of rotation of said turbine wheel.

9. In combination in a hydrokinetic transmission, a pump wheel, a turbine wheel, and a reaction wheel, means mounting said pump and turbine wheels for rotation each about an axis, said wheels defining a circuit for the flow of fluid therethrough in succession, said turbine wheel having the properties of torque and rate of rotation, a said wheel comprising a hub, a conical case encircling said hub and spaced radially therefrom to define a fluid flow passage, said case having a plurality of peripherally spaced slots therein, said slots being axially extensive, a plurality of blades mounted on said hub and each extending radially through a said slot, means mounting said blades for axial displacement relative to said case to vary the radial depth of said passage at said blades between said hub and said case, and means operably connected to said turbine wheel to displace said blades relative to said case as a function of a said property of said turbine wheel.

10. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump and turbine wheels for rotation about an axis, means to rotate said pump wheel to induce a flow of fluid through said turbine wheel to apply a torque thereto, means mounting said reaction wheel for adjustable axial displacement, said reaction wheel having a plurality of blades whose trailing edges extend radially transverse to a flow of said fluid thereacross, said conduit means having variable radial depth along an axial length thereof, said conduit means being designed for axial movement of said blades of said reaction wheel to localities of said conduit means of substantially different radial depths, and means operably connecting said reaction wheel to said turbine wheel to displace said reaction wheel axially to localities of said conduit means of substantially different radial depths.

11. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump and turbine wheels for rotation about an axis, means to rotate said pump wheel to induce a flow of fluid through said turbine wheel to apply a torque thereto, means mounting said reaction wheel for adjustable axial displacement, said reaction wheel having a plurality of blades in said conduit means each said blade having leading and trailing edges extending across said conduit for the free flow of said fluid across said blade in a direction from said leading to trailing edge and away from said blade across said trailing edge in the same said direction, said conduit means having localities of substantially different cross sectional depths therealong, and means to displace each said blade in a direction transverse to said trailing edges thereof from one said locality to another.

12. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump wheel for rotation about an axis and for adjustable displacement along said axis, means to rotate said pump wheel to induce a flow of fluid through said turbine to apply the properties of torque and rate of rotation thereto, means mounting said turbine wheel for rotation about an axis, said pump wheel having a plurality of spaced blades operable in said conduit means, said conduit having cross sections therealong of substantially different depths, each said blade having spaced leading and trailing edges extending across said cross sections for the flow of said fluid thereacross, and means to displace said blades each in a direction transverse to a said edge thereof to a said cross section of different depth as a function of a said property of said turbine wheel.

13. In combination, in a fluid transmission, a pump wheel, a turbine wheel and a reaction wheel arranged in succession, conduit means cooperating with said wheels to define a closed fluid circuit for the circulation of fluid through said wheels in succession, means mounting said pump wheel for rotation about an axis and for adjustable displacement along said axis, means to rotate said pump wheel to induce a flow of fluid through said turbine to apply the properties of torque and rate of rotation thereto, means mounting said turbine wheel for rotation about an axis, said pump wheel having a plurality of spaced blades operable in said conduit means, said conduit having cross sections therealong of substantially different depths, each said blade having spaced leading and trailing edges extending across said cross sections for the flow of said fluid thereacross, and means to displace said blades each in a direction transverse to a said edge thereof to a said cross section of different depth.

References Cited in the file of this patent

UNITED STATES PATENTS

| Number | Name | Date |
|---|---|---|
| 1,993,741 | Jandasek | Mar. 12, 1935 |
| 2,061,997 | Dunn | Nov. 24, 1936 |
| 2,074,170 | Dunn | Mar. 16, 1937 |
| 2,222,618 | Jandasek | Nov. 26, 1940 |
| 2,318,187 | Addison | May 4, 1943 |
| 2,363,952 | Fillmore | Nov. 28, 1944 |
| 2,378,353 | Zeider | June 12, 1945 |
| 2,385,059 | Buthe | Sept. 18, 1945 |
| 2,428,134 | Zeider | Sept. 30, 1947 |
| 2,544,713 | Miller | Mar. 13, 1951 |